United States Patent
Zolotorev et al.

(10) Patent No.: US 7,058,808 B1
(45) Date of Patent: Jun. 6, 2006

(54) METHOD FOR MAKING A BLIND RSA-SIGNATURE AND APPARATUS THEREFOR

(75) Inventors: Oleg Anatolievich Zolotorev, Saint Petersburg (RU); Ivan Vladimirovich Kuznetsov, Saint-Petersburg (RU); Andrei Gennadievich Moshonkin, Saint-Petersburg (RU); Alexandr Leonidovich Smirnov, Saint-Petersburg (RU); Ildar Magafurovich Khamitov, Saint-Petersburg (RU)

(73) Assignee: Cyphermint, Inc., Marlborough, MA (US)

( * ) Notice: Subject to any disclaimer, the term of this patent is extended or adjusted under 35 U.S.C. 154(b) by 0 days.

(21) Appl. No.: 09/445,385

(22) PCT Filed: Jun. 16, 1999

(86) PCT No.: PCT/RU98/00197

§ 371 (c)(1),
(2), (4) Date: Dec. 6, 1999

(87) PCT Pub. No.: WO99/67849

PCT Pub. Date: Dec. 29, 1999

(51) Int. Cl.
*H04L 9/30* (2006.01)

(52) U.S. Cl. ....................................... 713/176
(58) Field of Classification Search ................. 713/176, 713/180; 380/30, 229; 705/69
See application file for complete search history.

(56) References Cited

U.S. PATENT DOCUMENTS

| 4,206,315 A | 6/1980 | Matyas et al. |
| 4,264,782 A | 4/1981 | Konheim |
| 4,309,569 A | 1/1982 | Merkle |
| 4,386,233 A | 5/1983 | Smid et al. |
| 4,393,269 A | 7/1983 | Konheim et al. |

(Continued)

FOREIGN PATENT DOCUMENTS

EP          0318097         3/1989

OTHER PUBLICATIONS

Pointcheval et al., "Provably Secure Blind Signature Schemes,", Lecture notes in Comp. Sci. 1996.*
David Chaum, "Blind Signatures for Untraceable Payments," *Advanced Cryptology: Proceedings of the Crypto82*, 1983, pp. 199–203.

(Continued)

*Primary Examiner*—Gregory Morse
*Assistant Examiner*—Thomas Ho
(74) *Attorney, Agent, or Firm*—Myron Greenspan, Esq.; Lackenbach Siegel, LLP (57) ABSTRACT

The essence of the invention is in that when making a digital blind RSA-signature a new technique for blinding an initial data by a RSA-encryption and corresponding technique for unblinding the signed blinded data are employed, which gives the possibility to use an unlimited number of kinds of the signature in electronic systems of the mass scale service. The untraceability is ensured by a corresponding choice of the randomized exponent R, RSA-key used in RSA-encryption the initial data, and by the public module N properties verified in an arbitrary time moment. In so doing, $N = P \cdot Q$, where P and Q are secret prime factors, and R is multiple to $N-1$. In other variants of the invention the diversity of kinds of the signature is set by limitings on multiplicities of public exponents, said limitings being chosen prior to blinding the initial data. The apparatus to realize the method for making a digital blind RSA-signature comprises a blinding unit based on a modular exponentiator, and a corresponding unblinding unit.

29 Claims, 2 Drawing Sheets

U.S. PATENT DOCUMENTS

| | | | |
|---|---|---|---|
| 4,405,829 A | | 9/1983 | Rivest et al. |
| 4,625,076 A | | 11/1986 | Okamoto et al. |
| 4,759,063 A | | 7/1988 | Chaum |
| 4,759,064 A | * | 7/1988 | Chaum .................... 380/30 |
| 4,881,264 A | | 11/1989 | Merkle |
| 4,893,338 A | | 1/1990 | Pastor |
| 4,914,698 A | | 4/1990 | Chaum |
| 4,926,479 A | | 5/1990 | Goldwasser et al. |
| 4,926,480 A | | 5/1990 | Chaum |
| 4,933,970 A | | 6/1990 | Shamir |
| 4,944,007 A | | 7/1990 | Austin |
| 4,947,430 A | | 8/1990 | Chaum |
| 4,949,380 A | | 8/1990 | Chaum |
| 4,969,189 A | | 11/1990 | Ohta et al. |
| 4,977,595 A | | 12/1990 | Ohta et al. |
| 4,987,593 A | | 1/1991 | Chaum |
| 4,991,210 A | | 2/1991 | Chaum |
| 4,995,082 A | | 2/1991 | Schnorr |
| 4,996,711 A | | 2/1991 | Chaum |
| 5,005,200 A | * | 4/1991 | Fischer |
| 5,016,274 A | * | 5/1991 | Micali et al. |
| 5,020,105 A | * | 5/1991 | Rosen et al. |
| 5,131,039 A | * | 7/1992 | Chaum |
| 5,140,634 A | * | 8/1992 | Guillou et al. |
| 5,214,702 A | * | 5/1993 | Fischer |
| 5,224,162 A | * | 6/1993 | Okamoto et al. |
| 5,226,079 A | * | 7/1993 | Holloway |
| 5,231,666 A | * | 7/1993 | Matyas |
| 5,245,657 A | * | 9/1993 | Sakurai |
| 5,276,736 A | * | 1/1994 | Chaum |
| 5,295,188 A | * | 3/1994 | Wilson et al. |
| 5,297,202 A | * | 3/1994 | Kapp et al. |
| 5,297,206 A | | 3/1994 | Orton |
| 5,299,262 A | | 3/1994 | Brickell et al. |
| 5,315,658 A | | 5/1994 | Micali |
| 5,373,558 A | | 12/1994 | Chaum |
| 5,420,926 A | | 5/1995 | Low et al. |
| 5,434,919 A | | 7/1995 | Chaum |
| 5,442,707 A | | 8/1995 | Miyaji et al. |
| 5,446,796 A | | 8/1995 | Ishiguro et al. |
| 5,448,639 A | | 9/1995 | Arazi |
| 5,453,601 A | | 9/1995 | Rosen |
| 5,475,763 A | | 12/1995 | Kaufman et al. |
| 5,485,520 A | | 1/1996 | Chaum et al. |
| 5,493,614 A | | 2/1996 | Chaum |
| 5,502,764 A | | 3/1996 | Naccache |
| 5,511,121 A | | 4/1996 | Yacobi |
| 5,537,475 A | | 7/1996 | Micali |
| 5,553,145 A | | 9/1996 | Micali |
| 5,564,106 A | | 10/1996 | Puhl et al. |
| 5,577,124 A | | 11/1996 | Anshel et al. |
| 5,581,615 A | | 12/1996 | Stern |
| 5,588,061 A | | 12/1996 | Ganesan et al. |
| 5,590,197 A | | 12/1996 | Chen et al. |
| 5,604,805 A | | 2/1997 | Brands |
| 5,606,617 A | | 2/1997 | Brands |
| 5,610,982 A | | 3/1997 | Micali |
| 5,615,269 A | | 3/1997 | Micali |
| 5,625,692 A | | 4/1997 | Herzberg et al. |
| 5,625,695 A | | 4/1997 | MRaihi et al. |
| 5,627,893 A | | 5/1997 | Demytko |
| 5,629,982 A | | 5/1997 | Micali |
| 5,633,929 A | | 5/1997 | Kaliski, Jr. |
| 5,638,445 A | | 6/1997 | Spelman et al. |
| 5,638,447 A | | 6/1997 | Micali |
| 5,642,419 A | | 6/1997 | Rosen |
| 5,659,616 A | | 8/1997 | Sudia |
| 5,666,420 A | | 9/1997 | Micali |
| 5,668,878 A | | 9/1997 | Brands |
| 5,671,285 A | | 9/1997 | Newman |
| 5,677,955 A | | 10/1997 | Doggett et al. |
| 5,689,567 A | | 11/1997 | Miyauchi |
| 5,696,827 A | | 12/1997 | Brands |
| 5,708,714 A | | 1/1998 | Lopez et al. |
| 5,712,913 A | | 1/1998 | Chaum |
| 5,715,314 A | | 2/1998 | Payne et al. |
| 5,719,940 A | | 2/1998 | Ahn et al. |
| 5,734,901 A | | 3/1998 | Sidhu et al. |
| 5,754,654 A | | 5/1998 | Hiroya et al. |
| 5,761,311 A | | 6/1998 | Spelman et al. |
| 5,764,768 A | | 6/1998 | Spelman et al. |
| 5,768,385 A | | 6/1998 | Simon |
| 5,768,388 A | | 6/1998 | Goldwasser et al. |
| 5,781,631 A | | 7/1998 | Chaum |
| 5,790,667 A | | 8/1998 | Omori et al. |
| 5,790,675 A | | 8/1998 | Patarin |
| 5,790,677 A | | 8/1998 | Fox et al. |
| 5,799,086 A | | 8/1998 | Sudia |
| 5,799,087 A | | 8/1998 | Rosen |
| 5,805,702 A | | 9/1998 | Curry et al. |
| 5,806,063 A | | 9/1998 | Dickens |
| 5,812,670 A | | 9/1998 | Micali |
| 5,825,880 A | | 10/1998 | Sudia et al. |
| 5,825,884 A | | 10/1998 | Zdepski et al. |
| 5,832,089 A | | 11/1998 | Kravitz et al. |
| 5,832,090 A | | 11/1998 | Raspotnik |
| 5,848,161 A | | 12/1998 | Luneau et al. |
| 5,862,223 A | | 1/1999 | Walker et al. |
| 5,862,325 A | | 1/1999 | Reed et al. |
| 5,867,494 A | | 2/1999 | Krishnaswamy et al. |
| 5,867,578 A | | 2/1999 | Brickell et al. |
| 5,870,473 A | | 2/1999 | Boesch et al. |
| 5,870,476 A | | 2/1999 | Fischer |
| 5,872,844 A | | 2/1999 | Yacobi |
| 5,874,954 A | | 2/1999 | Kilmer et al. |
| 5,878,138 A | | 3/1999 | Yacobi |
| 5,878,140 A | | 3/1999 | Chaum |
| 5,878,141 A | | 3/1999 | Daly et al. |
| 5,878,143 A | | 3/1999 | Moore |
| 5,884,270 A | | 3/1999 | Walker et al. |
| 5,884,272 A | | 3/1999 | Walker et al. |
| 5,889,862 A | | 3/1999 | Ohta et al. |
| 5,889,863 A | | 3/1999 | Weber |
| 5,897,663 A | | 4/1999 | Stancil |
| 5,901,229 A | | 5/1999 | Fujisaki et al. |
| 5,905,976 A | | 5/1999 | Mjolsnes et al. |
| 5,909,492 A | | 6/1999 | Payne et al. |
| 5,910,989 A | | 6/1999 | Naccache |
| 5,915,022 A | | 6/1999 | Robinson et al. |
| 5,920,629 A | | 7/1999 | Rosen |
| 5,926,548 A | | 7/1999 | Okamoto |
| 5,982,506 A | | 11/1999 | Kara |
| 5,983,207 A | | 11/1999 | Turk et al. |
| 5,989,154 A | | 11/1999 | Christensen et al. |
| 5,999,625 A | | 12/1999 | Bellare et al. |
| 6,003,028 A | | 12/1999 | Koenig |
| 6,072,870 A | | 6/2000 | Nguyen et al. |

OTHER PUBLICATIONS

David, Chaum, "Security Without Identification: Card Computers to Make Big Brother Obsolete," in *Communications of the ACM,* vol. 10, Oct. 1985.

D. Pointcheval and J. Stem, "Provably Secure Blind Signature Schemes," *Lecture notes in Comp. Sci.,* 1163, 1996, pop. 252-65.

A.J. Menez, P.C. Van Oorshot, and S.A. Vanstonre, *Handbook of Applied Cryptography,* CRC Press, 1997, pp. 8, 145, 185, 285, 321, 348, 433.

Jon M. Peha and Khamitov, Pay Cash: A secure Efficient Internet Payment System, Accepted for Publication in *Proc. Of Fifth International Conference on Electronic Commerce,* Oct. 2003, pages 1-10.

* cited by examiner

METHOD FOR MAKING A BLIND RSA-SIGNATURE AND APPARATUS THEREFOR

FIELD OF THE INVENTION

The invention relates to cryptographic systems, and more particularly to systems utilizing digital signatures.

BACKGROUND OF THE INVENTION

Digital signatures are widely used in practice and play a role similar to the role of the usual hand-written signature. The advantages of the digital signature lie in the fact that its authenticity is easy to verify, its falsification is very difficult, and furthermore, the digital signature can easily be transmitted via telecommunication channels. Systems utilizing digital signature operate on data that are stored on a suitable material storage media and admit digital representation.

In the RSA-scheme, called so by the names of its inventors (R. L. Rivest, A. Shamir, L. M. Adleman, Cryptographic Communications System and Method, U.S. Pat. No. 4,405,829, 20 Sep. 1983), data are represented by integers from a certain residue system modulo an integer N, called the RSA-module. One usually takes the integers from 0 to N−1 as a residue system. For the sake of definiteness, notions related to the RSA-scheme (A. J. Menezes, P. C. Van Oorshot, S. A. Vanstone, Handbook of Applied Cryptography, CRC Press, 1997, p. 285, 433) may be equipped by the prefix RSA, for example: RSA-signature, RSA-encryption, RSA-key, RSA-exponent, etc.

The data S satisfies a digital RSA-signature property related to the data M with respect to the RSA-key with module N and exponent E, or in other words, S is a digital RSA-signature on the data M, if $M \equiv S^E$ (mod N), where the RSA-key means arbitrary data determining the module and exponent, and the formula $A \equiv B$ (mod N) means that A and B are congruent modulo N, i.e., the integer (A−B) is divisible by N without a remainder.

A digital RSA-signature on the data M can be made by a RSA-encryption of the data M, when a signer secret RSA-key corresponding to a public RSA-key with module N and exponent E is used as an encryption key. Here, the RSA-encryption means a processing of the data X resulting in obtaining a data Y satisfying the relation $Y \equiv X^C$ (mod N), where C and N are the exponent and module of the encryption RSA-key, respectively. The correspondence of two RSA-keys means the possibility of verifying the digital RSA-signature made by one RSA-key with the help of the other RSA-key, or what is the same, the possibility of decryption of the data encrypted by one key with the help of the other key. The correspondence of the RSA-keys with exponents A and B and module N is ensured by the condition $A \cdot B \equiv 1$ (mod $\phi(N)$), where $\phi(N)$ is the number of the residues coprime to N.

However, making a digital RSA-signature on the initial data M by directly RSA-encryption the initial data with the help of the signer secret RSA-key does not ensure the privacy of the suppliers, since the initial data to be signed are accessible to the signer when making the signature. This is clarified in the article D. Chaum, Blind signatures for untraceable payments, Advanced in Cryptology—Proceedings of Crypto 82, 1983, p. 199–203, where Chaum introduces the concept of blind digital signature, which is intended for overcoming this deficiency.

Known in the prior art is a method for making a blind digital RSA-signature (D. Chaum, Blind Signature Systems, U.S. Pat. No. 4,759,063, 19 Jul. 1988), in which the supplier wishing to obtain a digital RSA-signature on the initial data M chooses the randomized blinding key R and develops blinded data M' by the formula $M' \equiv R^E \cdot M$ (mod N), where E is the exponent and N is the module of the public RSA-key. The blinded data are given to the signer, who returns a digital RSA-signature S' on the blinded data to the supplier. The supplier completes obtaining the digital RSA-signature S on the initial data by unblinding the obtained digital RSA-signature on the blinded data with the help of the formula $S \equiv S' \cdot R^{-1}$ (mod N). The known method ensures untraceability, i.e. practical impossibility for the signer who obtains afterwards signatures on numerous initial data, to establish the correspondence between these signatures and the processed blinded data. However, the known method does not allow to obtain a blind digital RSA-signature without knowing the kind of signature in advance, since the exponent E of the public key determining the kind of signature is used for developing the blinded data.

Known in the prior art is a method for making a blind unanticipated digital RSA-signature (D. Chaum, Blind Unanticipated Signature Systems, U.S. Pat. No. 4,759,064, 19 Jul. 1988), which is the closest analog of the present invention and is chosen by the applicant as the prototype. In this method, a collection of admissible public RSA-exponents $E_1 \ldots, E_k$ and a collection of data $(g_1 \ldots g_u)$ called generators are used. For each generator $g_j$, digital RSA-signatures $S_{i,j}$ corresponding to each of the admissible public RSA-exponents $E_i$ are published. The supplier takes the collection $(k_1 \ldots, k_u)$ as the randomized blinding key R and develops blinded data M' by the formula $M' \equiv M \cdot g_1^{k_1} \cdot \ldots \cdot g_u^{k_u}$ mod N, where N is the module of the public RSA-key. The blinded data M' is given to the signer, who chooses the kind of signature, i.e., chooses that admissible public RSA-exponent $E_i$ to which the obtained digital RSA-signature corresponds. The digital RSA-signature S' on the blinded data corresponding to the chosen public RSA-exponent $E_i$, together with the information on the chosen public RSA-exponent $E_i$, is given to the supplier. The supplier obtains the digital RSA-signature S on the initial data by unblinding the RSA-signature S' with the help of the formula $S \equiv S' \cdot S_{i,1}^{-k_1} \cdot \ldots \cdot S_{i,u}^{-k_u}$ (mod N).

In the known method for making a blind unanticipated digital RSA-signature, the untraceability is ensured by certain properties of the generators with respect to secret RSA-keys, in which connection testing the suitability of the generators by the "cut and choose" method is used. The signature in the known method is called unanticipated because at the moment of giving the blinded data to the signer, the supplier does not know the kind of signature, i.e., the public RSA-exponent, to which the signature to be made will correspond.

The deficiencies of the known method are in that the number of kinds of the obtained RSA-signature is limited decreasing its unanticipatability, the probability of an error increases in making the signature, and the number of the kinds of signature slows down the rate of making the signature. The indicated deficiencies are caused by the necessity to perform the unblinding with the help of data which volume grows proportionally to the number of the kinds of signature, and in turn, the data themselves require additional resources and time for their storage and processing. Moreover, the known method has an insufficient trustworthiness of the untraceability, since the suitability of the data communicated by the signer, in particular, of the generators, is verified by a third party, and not directly by the supplier.

Known in the prior art is an apparatus for making a blind digital RSA-signature (D. Chaum, Blind Signature Systems, U.S. Pat. No. 4,759,063, 19 Jul. 1988). However, this apparatus is not sufficient for making a blind unanticipated digital RSA-signature.

Known in the prior art is an apparatus for making a blind unanticipated digital RSA-signature (D. Chaum, Blind Unanticipated Signature Systems, U.S. Pat. No. 4,759,064, 19 Jul. 1988), which is most close to the claimed apparatus and is chosen by the applicant as the prototype. The known apparatus consists of a blinding key choice unit including a random-number generator, a blinding unit, a signature unit, and an unblinding unit. The blinding unit has an initial data input and a blinding key input and comprises a modular exponentiator whose module input is connected to the module input of the blinding unit, and whose exponent input is connected to the blinding key input of the blinding unit. The signature unit has a secret key input and a signing data input connected with an output of the blinding unit. The unblinding unit has a module input, an exponent input, a blinding key input, an unblinding data input connected with an output of the signature unit, and an output for outputting the digital RSA-signature on the initial data.

The deficiencies of the known apparatus are in that it does not allow to use an unlimited number of kinds of signature when making a blind digital RSA-signature, which decreases the unanticipatability of the RSA-signature to be made, and in the case of employment of this apparatus, the probability of errors when making the signature increases and the number of kinds of signature slows down the rate of making the signature, which is caused by the necessity to enter certain data into the unblinding unit, and a procedure of searching these data requires time growing proportionally to the number of kinds of signature.

SUMMARY OF THE INVENTION

The main problem solved by the variants of the claimed invention is to create a method for making a blind digital RSA-signature and an apparatus for realization thereof, which ensure untraceability and high unanticipatability when making the digital RSA-signature, and also admit rapidly making a blind digital RSA-signature with relatively small resources.

The technical result common to all suggested variants of the present invention, which is achieved by their realization, is that in making a blind unanticipated digital RSA-signature, it is possible to use an unlimited number of kinds of signature, it is not necessary to use technical resources growing with the increase of the number of possible kinds of signature, and means for storing large volumes of data and searching in them, which leads to the acceleration of making a blind digital RSA-signature and to increasing its reliability. In addition, the trustworthiness of the untraceability increases for the reason that the properties of the data ensuring the untraceability can be tested, in some of the claimed variants, by the supplier himself.

The claimed method for making a blind digital RSA-signature is intended exclusively for a hardware or computer realization, since the digital RSA-signature itself admits only the hardware or computer realization (R. L. Rivest, A. Shamir, L. M. Adleman, Cryptographic Communications System and Method, U.S. Pat. No. 4,405,829, 20 Sep. 1983).

In the description of the invention, known means implementing basic arithmetical functions and basic functions of modular arithmetic are used. Such means can work with data representing integers of suitable length. To make the terminology more precise, functional definitions of the used apparatuses are given in what follows. By a modular multiplier a device with a module input and two argument inputs is meant such that if an integer N is fed to the module input, and integers X, Y are fed to the argument inputs, then an integer Z such that $Z \equiv X \cdot Y \pmod{N}$ appears at the output. By a modular inverter a device with a module input and an argument input is meant, such that if an integer N is fed to the module input, and an integer X, which is coprime to N, is fed to the argument input, then an integer Y such that $X \cdot = 1 \pmod{N}$ appears at the output. By a modular divider a device with a module input and a dividend and divisor inputs is meant such that if an integer N is fed to the module input, an integer X is fed to the dividend input, and an integer Y coprime to N is fed to the divisor input, then an integer Z such that $Z \cdot Y \equiv X \pmod{N}$ appears at the output. By a modular exponentiator a device with a module input, base input, and exponent input is meant such that if an integer N is fed to the module input, an integer X is fed to the base input, and an integer E is fed to the exponent input, then an integer Z such that $Z \equiv X^E \pmod{N}$ appears at the output. By a coprimality tester a device with two inputs is meant such that if two integers A and B are fed to the inputs, then at the output the Boolean value "TRUE" is obtained if the greatest common divisor of A and B is equal to 1, and the Boolean value "FALSE" otherwise.

A number of variants of the method for making a blind digital RSA-signature are suggested.

Below, a description of the method for making a blind digital RSA-signature by the first variant is given. The description is intended to describe the method for making a blind digital RSA-signature by the first variant, and should not be taken to limit the scope of the claimed invention, which is described more fully elsewhere in the present specification.

The signer chooses prime numbers of suitable size as secret factors of the RSA-module N, and two secret factors are chosen in the best mode. In addition, at least one admissible public RSA-exponent is chosen. Admissible public RSA-exponents, i.e., public RSA-exponents, such that when making the digital RSA-signature it is allowed to use a secret RSA-key corresponding to each of them, can be chosen by the signer, the supplier, jointly by the supplier and the signer, or in any other arbitrary way.

When making the digital RSA-signature on the initial data M, the supplier takes as the randomized blinding key an integer R, which is divisible by an arbitrarily taken masking factor G and coprime to each admissible public RSA-exponent. The randomization of R, i.e., introducing an element of chance into the choice of R, can be implemented, for example, with the help of a random-number generator or by other means.

By a random-number generator a device is meant, at which output data of suitable size are obtained, preferably unpredictable for a party not having control of the work of such a device. Such devices are well known in the art. In particular, "pseudo-random" number generators can be used as the random-number generators.

The coprimality of the randomized blinding key with each admissible public RSA-exponent is achieved, in particular, either by correcting the output data of the random-number generator with the help of admissible public RSA-exponents, or by testing the output data of the random-number generator. The divisibility of the randomized blinding key by the masking factor G is achieved, in particular, by correcting the output data of the random-number generator with the help of the masking factor.

Using the blinding key R, the supplier blinds the initial data M and develops on their base blinded data M' with the help of the RSA-encryption of the initial data by the encryption RSA-key which module coincides with the RSA-module N, and which exponent coincides with the blinding key R. Such an encryption can be carried out, in particular, by a modular exponentiator. The blinded data M' satisfy the relation $M' \equiv M^R \pmod{N}$. The developed blinded data M' are given to the signer, who develops a digital RSA-signature S' on the blinded data with the help of the secret RSA-key corresponding to an arbitrary admissible public RSA-exponent E. Here, by the correspondence of a secret RSA-key to a public RSA-exponent E the correspondence of the secret RSA-key and the RSA-key to the module N and the exponent E is meant. The digital RSA-signature S' on the blinded data M' can be developed, in particular, with the help of a modular exponentiator, and the created digital RSA-signature S' on the blinded data M' satisfies the relation $S' \equiv (M')^D \pmod{N}$.

Making the digital RSA-signature S on the initial data M is completed by unblinding the digital RSA-signature on the blinded data. The theoretical possibility of unblinding follows from the relation $S \equiv (S')^A \cdot M^B \pmod{N}$, where A and B are arbitrary integers satisfying the condition $A \cdot R + B \cdot E = 1$, and from the coprimality of the blinding key R and the public RSA-exponent E, which is ensured by choosing the blinding key R to be coprime to each admissible public RSA-exponent. In practice, the unblinding transformation is performed by entering the digital RSA-signature on the blinded data S', the blinding key R, the RSA-module N, and an admissible public RSA-exponent E into a suitable unblinding converter, at which output the digital RSA-signature S on the initial data M is obtained. Such an unblinding converter can be realized, for example, by the modular multiplicative Euclidean converter (MMEC), i.e., a device with a module input, two base inputs, two corresponding exponent inputs, and an output, such that if a positive integer N is fed onto the module input of the MMEC, an integer X coprime to N is fed onto one of the base inputs, an integer A is fed onto the corresponding exponent input, an integer Y coprime to N is fed onto the other base input, and an integer B coprime to A is fed onto the corresponding exponent input, then at the output an integer Z such that $Z \equiv X^C \cdot Y^D \pmod{N}$ is obtained, where C and D are arbitrary integers satisfying the relation $A \cdot C + B \cdot D = 1$. To confirm the realizability of an MMEC, the applicant describes an example of a concrete realization of an MMEC and of its performance in Example 5 given below. Other examples of MMEC could be implemented by those skilled in the art on the basis of the known information. For example, the integers C and D can be determined from the integers A and B with the help of a device implementing the familiar generalized Euclid algorithm (D. Knuth, The Art of Computer Programming, Vol.2, Seminumerical Algorithms (Russian translation), Mir Publishers, Moscow, 1977, pp. 367–368), after which Z can be obtained with the help of a modular exponentiators and a modular multiplier.

The untraceability in the method for making a blind digital RSA-signature by the first variant is ensured, in particular, by choosing the secret factors and the masking factor which ensure the suitable blinding level. By the blinding level the probability is meant of the fact that for random initial data X uniformly distributed among all the invertible residues modulo N, and random independent data $Y_1$ and $Y_2$ uniformly distributed among the invertible residues modulo N that are G-th powers modulo N, the probability of obtaining $Y_1$ by blinding X is equal to the probability of obtaining $Y_2$ by blinding X. If the blinding level is close to the unity, then practically every blinded data can correspond with equal probability to practically every initial data, which ensures the untraceability. Smaller values of the blinding level ensure smaller untraceability. For example, if the blinding level is close to one third, then, in the general case, for a large number of initial data, the signer can couple individual initial data with one of the three groups of blinded data. Here, within each of the three groups, all correspondences between the initial data and the blinded data will be equiprobable. In practice, the acceptability of such level of untraceability depends on the problem to be solved.

The predetermined blinding level is ensured, in particular, by choosing the RSA-module corresponding to exactly two secret factors P and Q and by choosing the masking factor G to be a multiple of the greatest common divisor of the numbers P–1 and Q–1, and also a multiple of all divisors of each of numbers P–1 and Q–1 that are less than a predetermined bound U.

The choice of an appropriate bound U, in particular, is ensured by the fact that if one chooses exactly two secret factors P and Q and a masking factor G which is divisible both by the greatest common divisor of the numbers P–1 and Q–1 and by all divisors of each of the numbers P–1 and Q–1 that are less than U, then the blinding level is greater than $(1-\text{Log}(N)/[U \cdot \text{Log}(U+1)])^2$. For example, if the RSA-module has a length of 1024 bits and $U=10^8$, then the blinding level is greater than $1-4 \cdot 10^{-7}$. This estimate is confirmed by the fact that the blinding level is at least $(1-W)^2$, where W is the probability of the fact that the set of all blinded data that can be developed on the basis of the initial data M randomly and uniformly distributed among all invertible residues modulo N, i.e., the set of the invertible residues of the form $M^R \pmod{N}$, where R runs through all integers divisible by G, coincides with the group Z of all invertible residues of the form $C^G \pmod{N}$, where C runs through all invertible residues modulo N. The probability W does not exceed $1-\pi(1-L^{-1})$, where the product is taken over all prime divisors L of $(P-1) \cdot (Q-1)$ that are greater than U. In particular, the probability W is less than $\text{Log}(N)/[U \cdot \text{Log}(U+1)]$.

The divisibility of the masking factor G by all divisors of each of numbers P–1 and Q–1 that are less than a predetermined bound U, is ensured, in particular, by the fact that, when choosing the secret factors P and Q, one tests whether they are congruent to the unity modulo all divisors that are greater than 2 and less than U, and after testing, the masking factor is chosen to be divisible by all divisors that are less than U, and modulo which is congruent to the unity at least one of the chosen secret factors.

In addition, the divisibility of the masking factor G by all divisors of each of the numbers P–1 and Q–1 that are less than a predetermined bound U, is ensured, in particular, by the fact the secret factors P and Q are chosen so that P–1 and Q–1 are not divisible by any of the divisors that are greater than 2 and less than a predetermined bound U and that do not divide the chosen masking factor G.

The divisibility of the masking factor G by the greatest common divisor of the secret factors decremented by 1 is ensured, in particular, by additionally pairwise testing the secret factors for congruence with 1 modulo all those divisors which are greater than 2. Furthermore, the divisibility of the masking factor G by the greatest common divisor of the numbers P–1 and Q–1 can be ensured by taking the masking factor G to be even, and taking the secret factors P and Q so that the greatest common divisor of the numbers P−1 and Q−1 is equal to 2.

In addition, the divisibility of the masking factor G by the greatest common divisor of the numbers P−1 and Q−1 is ensured, in particular, by taking the masking factor G to be a multiple of the greatest divisor of N−1 that is coprime to the chosen admissible public RSA-exponents. In this case, the fact that G is a multiple of the greatest common divisor of the numbers P−1 and Q−1 is confirmed by the fact that N−1 is divisible by all common divisors of P−1 and Q−1, since N−1=(P−1)·Q+(Q−1). What is more, the divisibility of the masking factor G to be chosen by the greatest divisor of N−1 coprime to the chosen admissible public RSA-exponents is ensured by choosing admissible public RSA-exponents to be coprime to N−1 and by choosing the number N−1 as the masking factor G.

High unanticipatability of the method for making a blind digital RSA-signature by the first variant is ensured, in particular, by an arbitrary choice of the secret RSA-key corresponding to the chosen secret factors and to an arbitrary admissible public RSA-exponent and by choosing an arbitrarily large set of admissible public RSA-exponents, each of which corresponds to a certain kind of the signature. The choice of the kind of signature, i.e., of the public RSA-exponent corresponding to the secret key that is used when making a signature on the blinded data, can be performed by the supplier, by the signer, jointly by the supplier and the signer, or in a different way.

Furthermore, the high unanticipatability of the method for making a blind digital RSA-signature by the first variant is ensured by the fact that blinding the initial data does not require the admissible public RSA-exponents themselves, and it is only required to ensure the coprimality of the blinding key with each admissible public RSA-exponent. Such a choice, even for a very large set of admissible public RSA-exponents, can be performed very effectively. For example, if, when choosing admissible public RSA-exponents, one chooses at least one basic public RSA-exponent, and an arbitrary public RSA-exponent, whose divisors are divisors of the chosen basic public RSA-exponents, is taken as the admissible public RSA-exponent then the choice of the blinding key coprime to each of the admissible public RSA-exponents is performed by testing its coprimality with each of the basic public RSA-exponents. The set of the basic public RSA-exponents can be given, for example, by explicit enumeration, by indication of its boundaries, or by other means. For example, if the integer $L_1 \cdot \ldots \cdot L_k$, is chosen as the basic public RSA-exponent, then the set of admissible public RSA-exponents is practically unlimited, since every integer of the form $L_1^{K_1} \cdot \ldots \cdot L_k^{K_k}$, where $K_1, \ldots, K_k$ are nonnegative integers, can be chosen as an admissible public RSA-exponent.

As indicated above, the untraceability in the method for making a blind digital RSA-signature by the first variant is ensured, in particular, by choosing the RSA-module corresponding to exactly two secret factors P and Q and by choosing the masking factor G to be a multiple both of the greatest common divisor of the numbers P−1 and Q−1 and of all divisors of each of the numbers P−1 and Q−1, which are less than an appropriate predetermined bound U. The suppliers can check these properties of the secret factors and of the masking factor with the help of the known method "cut and choose" and without disclosing the secret factors by the signer. More precisely, the signer initially chooses a large number of sets of RSA-modules and masking factors and makes them public. The suppliers' representative chooses a sufficiently large part of the published sets, after which the signer discloses the corresponding secret factors for each set chosen by the suppliers' representative. Having the secret factors, the suppliers' representative checks the properties of the secret factors and of the masking factor in the chosen sets. Thus, the suppliers' representative convinces himself indirectly of the correctness of the choice of the secret factors and the masking factor in the sets not chosen by him, one of which is used by the signer for making the signature.

Furthermore, the trustworthiness of untraceability in some variants increases for the reason that the properties of the data ensuring the untraceability can be tested by the supplier himself, and not by his representative, at an arbitrary moment of time. Namely, as indicated above, the untraceability, in particular, is ensured by the fact that the RSA-module is the product of exactly two secret factors P and Q, and that the masking factor is divisible by all divisors of P−1 and Q−1 which are greater than 2 and less than a certain predetermined bound U. In this case, the supplier can check the mentioned properties of the RSA-module and the masking factor with the help of the signer, however, without confiding to the signer or to a third party. Here, the signer confides his secrets to no third party.

Testing the fact that the RSA-module N is the product of exactly two prime factors can be implemented, in particular, as follows. The signer communicates to the interested parties a pair of numbers (U, V) such that each invertible residue modulo N, multiplied by a quadratic residue modulo N, is congruent to one of the numbers {1, U, V, UV} modulo N. After that, the supplier can test the property of N indicated above with the help of the signer, for example, as follows. The supplier gives a random number X to the signer, who returns to the supplier the data Y such that $Y^2 \cdot X^{-1}$ (mod N)∈{1, U, V, UV}. Every such an answer reduces the probability of the fact that N consists of more than two factors, at least, by one half. For the signer security, it could be required that X is either a prime number not exceeding a certain predetermined bound, or a value taken by a certain cryptographic hash-function (A. J. Menezes, P. C. Van Oorshot, S. A. Vanstone, Handbook of Applied Cryptography, CRC Press, 1997, p. 321) on a value shown by the tester. Furthermore, if the answers to such requests are obtained for all prime numbers X less than a certain explicit bound, then the supplier can be sure that N is the product of at most two prime numbers, since if the RSA-module N is the product of at least three prime numbers and for each prime odd number L less than T there is a residue X modulo N such that $L \cdot X^2$ (mod N) belongs to the set {1, U, V, UV}, then the generalized Riemann hypothesis which, though not proved mathematically, has been verified experimentally to a large degree, implies that T is less than $C[\text{Log}(N)]^2$, where the value C can be obtained with the help of the known estimates (J. Oesterle, Versions effectives du theoreme de Chebotarev sous l'hypothese de Riemann generalisee, Soc. Math. De France, Asterisque 61, 1979, p. 165–167). In particular, it is sufficient to take C=70.

To verify that the masking factor is divisible by all divisors of P−1 and Q−1 that are greater than 2 and less than a certain predetermined bound U, it is sufficient for the supplier to ascertain that for each integer L which is less than a predetermined bound, does not divide the masking factor G, and is either an odd prime number or equal to 4, P−1 and Q−1 are not divisible by L. For this purpose, in the case of an odd L, the supplier sends a request R to the signer and receives the answer $R^{1/L}$ (mod N). Every such an answer to a request lowers by a factor L the probability of the fact that P−1 or Q−1 is divisible by L. For the signer security, one could require that R either be less than a certain bound or be the value taken by a certain cryptographic hash-function on the value indicated by the supplier. Furthermore, if the answers to such requests are obtained for all prime numbers R less than a certain explicit bound, then the supplier can be sure that P−1 and Q−1 have no odd prime divisors L less than a certain predetermined bound, since if N is divisible by an odd prime number P, and P−1 is divisible by an odd prime L, and for each residue R modulo N, where R is less than a predetermined bound T, there is a residue A such that $A^L \equiv R$ (mod N), then the generalized Riemann hypothesis implies that T is less than $D(\text{Log } N)^2$, where the value D can be obtained with the help of the known estimates (J. Oesterle, Versions effectives du theoreme de Chebotarev sous l'hypothese de Riemann generalisee, Soc. Math. De France, Asterisque 61, 1979, p. 165–167). In particular, it is sufficient to take D=70. Instead of verifying the fact that P−1 and Q−1 are not divisible by L for each individual L, it is sufficient to verify this property for a set of numbers $A_1, \ldots, A^s$, such that each prime number that is less than a certain predetermined bound divides at least one of the $A^i$. The supplier can make sure that P−1 and Q−1 are not divisible by 4 in the following way. First, having checked that that P−1 and Q−1 are not divisible by 3, the supplier can be sure that the integer (−3) is not congruent to the square of any integer modulo P and modulo Q. Second, the signer convinces the supplier that the integer 3 is a square modulo P and modulo Q by giving an integer R such that $R^2 \equiv 3$ (mod N). Thus, the supplier makes sure that the integer (−1) is not congruent to the square of any integer both modulo P and modulo Q, and, consequently, makes sure that P−1 and Q−1 are not divisible by 4. In addition, having checked that P−1 and Q−1 are not divisible by 4, the supplier can make sure that P−1 and Q−1 are not divisible by an odd prime number L by verifying that the integer X is not congruent to the square of any integer modulo P and modulo Q, where X=L, if L≡1 (mod 4) and X=−L, if L≡3 (mod 4). The signer convinces the supplier of this fact by giving an integer R such that $R^2 \equiv -X$ (mod N). This is possible for approximately one half of odd numbers L.

Below, a description of the method for making a blind digital RSA-signature by the second variant is presented. The description is intended to describe the method for making a blind digital RSA-signature by the second variant and should not be taken to limit the scope of the invention, which is described more fully elsewhere in the present specification.

The signer chooses prime numbers of suitable size as the secret factors of the RSA-module N, and two secret factors are chosen in the best mode. The chosen RSA-module N is made public. Furthermore, one chooses arbitrary basic public RSA-exponents $E_1, \ldots, E_k$, which number depends on the problem to be solved. Such a choice can be performed by the supplier, by the signer, jointly by the supplier and the signer, or in a different way. In addition, arbitrary nonnegative integers are chosen as the limiting multiplicities $L_1, \ldots, L_k$ of the basic public RSA-exponents $E_1, \ldots, E_k$, respectively. Such a choice can be performed by the supplier, by the signer, jointly by the supplier and the signer, or in a different way. As an admissible public RSA-exponent, one takes an arbitrary public RSA-exponent composed of chosen basic public RSA-exponents, taking the multiplicity of each of them in the limits of the chosen limiting multiplicity. In other words, the admissible public RSA-exponents of the form $E = E_1^{A1} \cdot \ldots \cdot E_k^{Ak}$ are taken as admissible, where each of the multiplicities $A_1, \ldots, A_k$, with which the basic public RSA-exponents $E_1, \ldots, E_k$, respectively, occur in E, is a nonnegative integer not exceeding the limiting multiplicities $L_1, \ldots, L_k$, respectively.

When making a blind digital RSA-signature on the initial data M, the supplier takes an integer of suitable size as the randomized blinding key R. The choice of the randomized blinding key R can be carried out by the random-number generator.

The supplier develops blinded data M' by processing the chosen initial data with the help of the data F obtained as a result of RSA-encryption the blinding key R. The blinded data M' satisfy the relation M'=F·M (mod N) and can be obtained by the modular multiplier. The data F is obtained by RSA-encryption the blinding key R with the help of the encryption RSA-key which corresponds to the RSA-module N and to the RSA-exponent U composed of the chosen basic public RSA-exponents $E_1, \ldots, E_k$, each of which is taken with the chosen limiting multiplicity $L_1, \ldots, L_k$, respectively. In other words, $F = R^U$ (mod N), where $U = U_1 \cdot \ldots \cdot U_k$, and $U_1 = E_1^{L1}, :, U_k = E_k^{Lk}$. In particular, when developing blinded data, the RSA-encryption can be carried out by a modular exponentiator.

The blinded data M' are given to the signer, who develops the digital RSA-signature S' on the blinded data M' with the help of the secret RSA-key corresponding to the chosen secret factors and to an arbitrary admissible public RSA-exponent V. The choice of the employed secret RSA-key is implemented by an arbitrary choice of the employed multiplicities $K_1, \ldots, K_k$ of the basic public RSA-exponents $E_1, \ldots, E_k$, respectively. Here, the employed multiplicities $K_1, \ldots, K_k$ are chosen in the limits of the chosen limiting multiplicities $L_1, \ldots, L_k$, respectively. In other words, the multiplicities $K_1, \ldots, K_k$ are nonnegative integers not exceeding the numbers $L_1, \ldots, L_k$, respectively, and $V = E_1^{K1} \cdot \ldots \cdot E_k^{Kk}$. The digital RSA-signature S' on the blinded data M' can be developed, in particular, by a modular exponentiator. The developed digital RSA-signature S' on the blinded data M' satisfies the relation $S' \equiv (M')^D$ (mod N), where D is the secret RSA-exponent corresponding to the public RSA-exponent E. In particular, the digital RSA-signature S' on the blinded data can be developed by a modular exponentiator. The developed digital RSA-signature S' on the blinded data M' is given to the supplier.

The supplier develops an unblinding key T corresponding to the blinding key R and the secret RSA-key used for developing the digital RSA-signature on the blinded data, by RSA-encryption the blinding key with the help of the encryption RSA-key which module is the RSA-module, and which RSA-exponent corresponds to the basic public RSA-exponents, each of which is taken with multiplicity $L_1 - K_1, \ldots, L_k - K_k$, respectively. In other words, the unblinding key T satisfies the relation $T = R^V$ (mod N), where $V = V_1 \cdot \ldots \cdot V_k$, $V_1 = E_1^{L1-K1}, \ldots, V_k = E_k^{Lk-Kk}$. In particular, when developing the unblinding key the RSA-encryption can be carried out by a modular exponentiator. The digital RSA-signature S' on the blinded data is unblinded by entering S', the unblinding key T, and the RSA-module N into the unblinding converter. At the output of the unblinding converter, one obtains data S satisfying the relation $S \equiv S' \cdot T^{-1}$ (mod N), which is a digital RSA-signature on the initial data M.

In particular, the RSA-encryption of the blinding key R when developing the blinded data can be implemented by successive RSA-encryptions with the help of encryption RSA-keys, such that the module of each of them is equal to N, and as the RSA-exponent of the next encryption key one takes the next basic public RSA-exponent $E_i$ with limiting multiplicity $L_i$, i.e., the RSA-exponent $U_i = E_i^{Li}$, where the subscript i takes successively the values from 1 to k.

Furthermore, the unblinding key T can be developed by successive RSA-encryptions with the help of encryption RSA-keys, the RSA-module N is taken as the module of each of them, and as the RSA-exponent of the next encryption key one takes the next basic public RSA-exponent $E_i$ with multiplicity $L_i-K_i$, i.e., the RSA-exponent $V_i=E_i^{Li-Ki}$, where the subscript i takes successively the values from 1 to k.

An apparatus implementing the claimed method for making a digital RSA-signature is suggested. Below, a description of the suggested apparatus is given, which is intended to describe the claimed apparatus and should not be taken to limit the scope of the invention, which is described more fully elsewhere in the present specification.

In the description given below, by a divider a device with a dividend and divisor input is meant, such that if an integer X is fed to the dividend input, and a positive integer Y is fed to the divisor input, then at the output the incomplete quotient of X and Y is obtained, i.e., an integer Z such that $0 \leq X-Y \cdot Z < Y$. By the remainder calculator a device with an argument input and a module input is meant, such that if an integer X is fed to the argument input and a positive integer Y is fed to the module input, then at the output the remainder of division of X by Y is obtained, i.e., an integer Z from the interval 0 to Y–1 such that X–Z is divisible by Y without a remainder. Such dividers and remainder calculators are well known in the art.

Figure 1:
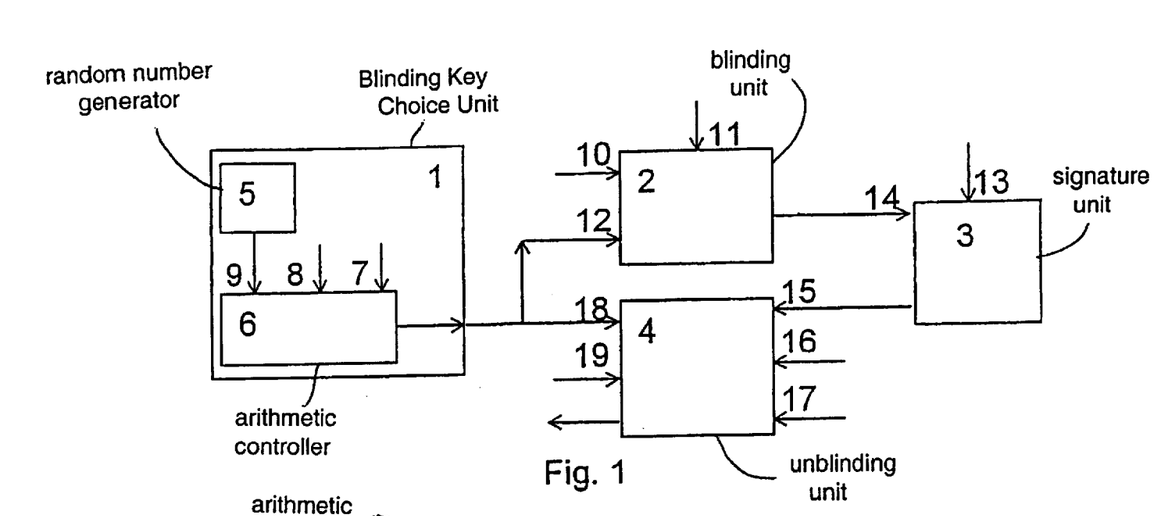
FIG. 1 shows an apparatus for making a blind digital RSA-signature.

The description is illustrated by FIG. 1, which depicts an apparatus for making a blind digital RSA-signature, comprising a blinding key choice unit 1, a blinding unit 2, a signature unit 3, and an unblinding unit 4. The blinding key choice unit comprises a random-number generator 5 and an arithmetic controller 6, which has an inadmissible divisor input 7, an obligatory divisor input 8, and a trial data input 9, the output of the random-number generator being connected to the trial data input 9 of the arithmetic controller, and the output of arithmetic controller 6 being connected to the output of the blinding key choice unit. Blinding unit 2 has an initial data input 10, a module input 11, and a blinding key input 12, and comprises a modular exponentiator not shown in FIG. 1, the initial data input 10, the blinding key input 12 and the module input 11 of the blinding unit being connected to the base input, the exponent input, and the module input of the modular exponentiator, respectively. Signature unit 3 has a secret key input 13 and a signature data input 14, the signature data input 14 of the signature unit 3 being connected to the output of the blinding unit 2. The unblinding unit 4 has an unblinding data input 15, a module input 16, an exponent input 17, a blinding key input 18 and an initial data input 19 and comprises a modular multiplicative Euclidean converter (MMEC), which is not shown in FIG. 1, the module input 16 being connected to the module input of the MMEC, the initial data input 19 being connected to one of the base inputs of the MMEC, and the unblinding data input 15 being connected to another base input of the MMEC, the blinding key input 18 being connected to the exponent input of the MMEC corresponding to the base input of the MME C connected to the unblinding data input 15, and the exponent input 17 being connected to the exponent input of the MMEC corresponding to the base input of the MMEC connected to the initial data input 19, and the output of the MMEC being connected to the output of the unblinding unit.

By the arithmetic controller a device is meant ensuring predetermined arithmetical properties of the output data of the apparatus which work is controlled by the arithmetic controller. In particular, in the description given above the arithmetic controller ensures the coprimality of the output data of the blinding key choice unit with the integers fed to the first limiting input of the arithmetic controller, and the divisibility of the output data of the blinding key choice unit by the integer fed to the second limiting input of the arithmetic controller.

With the help of the suggested apparatus, the supplier, with the participation of the signer, can make a blind digital RSA-signature on the initial data by the first variant of the claimed method. For this purpose, the supplier feeds the initial data M onto the initial data input, and the RSA-module N known from the communication of the signer onto the module input of the blinding unit. In addition, the supplier feeds the basic public RSA-exponents onto the first limiting input of the arithmetic controller, and the masking factor onto the second limiting input of the arithmetic controller. The blinding key R appears at the output of the blinding key choice unit and is fed to the blinding key input of the blinding unit at which output the blinded data M' appears. The signer feeds the employed secret RSA-key to the secret key input of the signature unit. The blinded data M' are fed to the signing data input of the signature unit, and the digital RSA-signature S' on the blinded data M' appears at the output of the signature unit and is fed to the unblinding data input of the unblinding unit. In addition, the supplier feeds the RSA-module N, the initial data M, and the public RSA-exponent E corresponding to the employed secret RSA-key, respectively, onto the module input, the initial data input, and the exponent input of the unblinding unit. In addition, the blinding key R is fed into the blinding key input of the unblinding unit from the output of the blinding key choice unit. The digital RSA-signature S on the initial data appears at the output of the unblinding unit.

BRIEF DESCRIPTION OF THE DRAWINGS

In what follows the present invention is clarified by the description of specific examples of its implementation and by accompanying drawings, where.

BEST EMBODIMENT OF THE INVENTION

In the best embodiment of the method for making a blind digital RSA-signature by the first variant, the blinding level W is set, which depends on the problem to be solved. By the predetermined blinding level, a bound U is set sufficient for ensuring the predetermined blinding level. The bound U can be determined with the help of the formulas that relate U with the blinding level and are given in the description of the invention. Furthermore, several odd integers are chosen as basic public RSA-exponents which number depends on the problem to be solved, and an arbitrary public RSA-exponent is chosen as the admissible public RSA-exponent, which divisors are divisors of the chosen basic public RSA-exponents. The signer takes two prime numbers P and Q of suitable size as the secret factors, such that each of the integers P–1 and Q–1 has no divisors greater than 2 and less than the predetermined bound U, and is coprime to each of the chosen basic public RSA-exponent. The choice of such prime numbers can be performed, for example, by testing the trial prime numbers, which are obtained in one of the known ways with the help of random-number generators. The RSA-module N is obtained by multiplication of the chosen secret factors. The chosen RSA-module N, the chosen basic admissible exponents, and chosen the bound U are made public. The greatest of those divisors of the RSA-module decremented by 1 that are coprime to the chosen admissible public RSA-exponents is chosen as the masking factor G.

The supplier chooses the randomized blinding key R as the product of the masking factor and of an integer of suitable size obtained at the output of a cryptographic random-number generator with uniform distribution (A. J. Menezes, P. C. Van Oorshot, S. A. Vanstone, Handbook of Applied Cryptography, CRC Press, 1997, p. 185).

The supplier blinds the initial data M and develops on their base the blinded data M' with the help of the RSA-encryption of the initial data by the encryption RSA-key with the module N and exponent R. The developed blinded data M' is given to the signer. The signer performs the choice of the kind of signature, i.e., the choice of the admissible public RSA-exponent E, corresponding to the secret key used for making a signature on the blinded data and develops the digital RSA-signature S' on the blinded data M' with the help of the secret RSA-key corresponding to the chosen public RSA-exponent E. The developed digital RSA-signature S' on the blinded data M' is given to the supplier together with the information on the chosen admissible public RSA-exponent E, after which the supplier completes making the digital RSA-signature S on the initial data M by unblinding the RSA-signature S' with the help of the unblinding converter.

The signature property of the digital RSA-signature on the initial data M can be confirmed for the data S obtained at the output of the unblinding converter either after their unblinding by a direct verification, or before their unblinding by verifying the fact that S' meets a digital RSA-signature property related to the blinded data M'.

In addition, to verify that the predetermined blinding level is ensured, the supplier can check, by one of the ways described in the description of the invention, whether the published RSA-module is composed of exactly two secret factors, and each of the secret factors is not congruent to the unity modulo the divisors greater than 2 and less than the published bound U.

The possibility of realization of the above-described best embodiment of the method for making a blind digital RSA-signature by the first variant is clarified by the following example.

EXAMPLE 1

Suppose that secret factors having size of 512 bits are used, and the blinding level $W=1-4\cdot 10^{-7}$ is assumed to be sufficient. With the help of the formulas presented in the description of the invention, the bound $U=10^{-8}$ is set sufficient for ensuring the predetermined blinding level. The integers $E_1=3$, $E_2=5$, $E_3=7$ are chosen as basic public RSA-exponents. The signer takes as the secret factors two prime numbers P and Q having size of 512 bits and the RSA-module $N=P\cdot Q$, which is obtained from P and Q with the help of the multiplier. Here, the secret factors are chosen to be such that each one of the integers P−1 and Q−1 has no divisors greater than 2 and less than the predetermined bound U, and each one of the integers P−1, Q−1, and N−1 is coprime to each basic public RSA-exponent. Such secret factors are chosen by testing the mentioned properties of the trial secret factors, which re prime numbers having size of 512 bits and obtained with the help of the cryptographic random-number generator. The choice of such prime numbers and their testing is performed in one of the known ways (A. J. Menezes, P. C. Van Oorshot, S. A. Vanstone, Handbook of Applied Cryptography, CRC Press, 1997, p. 145). The chosen RSA-module N and the basic admissible exponents are made public.

For choosing the masking factor, a subtractor is used, to the minuend input of which the RSA-module N is fed and to the subtrahend input of which the integer 1 is fed. At the subtractor output the integer N−1 is obtained, which is taken as the trial masking factor. The trial masking factor is processed by each of the basic public RSA-exponents. The processing of the trial masking factor by each current basic public RSA-exponent $E_i$ is performed in several steps, each of which proceeds as follows. In the case where the trial masking factor is coprime to $E_i$, which fact is detected by a coprimality tester, one assumes that the processing of the trial masking factor by the current basic public RSA-exponent $E_i$ is finished, and proceeds to processing the trial masking factor by the next basic public RSA-exponent. In the case where the trial masking factor is not coprime to $E_i$, the trial masking factor is fed to the dividend input, and $E_i$ is fed to the divisor input of the divider which output data are taken as the new trial masking factor. After this, to the next step of processing the trial masking factor by the basic public RSA-exponent $E_i$ is performed. The trial masking factor processed by each of the basic public RSA-exponents is taken as the trial masking factor G.

The supplier obtains the randomized blinding key R at the output of the multiplier to which inputs the masking factor G and an integer of suitable size are fed, which integer is coprime to each basic public RSA-exponent. Such an integer is obtained by checking whether the trial integers obtained at the output of the cryptographic random-number generator with uniform distribution are coprime to each of the basic public RSA-exponents. The supplier chooses an arbitrary integer representing the data to be signed as the initial data M. Initial data M are fed to the base input of the modular exponentiator, the blinding key R is fed to the exponent input of the modular exponentiator, and the RSA-module N is fed to the module input of the modular exponentiator. At the output of the modular exponentiator the blinded data M' are obtained, which are delivered to the signer via telecommunication nets.

The signer takes, as the secret key, the pair consisting of the RSA-module N and a secret RSA-exponent D, and the choice of the secret RSA-exponent is carried out by choosing arbitrary nonnegative integers $K_1$, $K_2$, and $K_3$ as the multiplicities of basic public RSA-exponents $E_1$, $E_2$, and $E_3$, respectively. The secret RSA-exponent D is obtained with the help of the modular exponentiator and the modular multiplier, and the obtained secret RSA-exponent satisfies the relation $D \equiv D_1^{K_1} \cdot D_2^{K_2} \cdot D_3^{K_3} \pmod{(P-1)\cdot(Q-1)}$. Here, $D_1$ is obtained at the output of the modular inverter to which module input the integer $(P-1)\cdot(Q-1)$ is fed, and to which argument input the basic public RSA-exponent $E_1$ is fed. Now, $D_2$ is obtained from $E_2$, and $D_3$ is obtained from $E_3$ in a similar way. The blinded data M' is fed onto the base input of the modular exponentiator, the secret RSA-exponent D is fed onto the exponent input of the modular exponentiator, and the RSA-module N is fed onto the module input of the modular exponentiator. The data S' obtained at the output of the modular exponentiator is given to the supplier as a digital RSA-signature on blinded data together with the chosen multiplicities $K_1$, $K_2$ and $K_3$.

Using the modular exponentiators and the modular multiplier, the supplier obtains a public RSA-exponent E satisfying the relation $E \equiv E_1^{K_1} \cdot E_2^{K_2} \cdot E_3^{K_3} \pmod{(P-1)\cdot(Q-}$ 1)). When unblinding, the digital RSA-signature S' on the blinded data M' is fed to the first base input of an MMEC, the initial data M is fed to the second base input of the MMEC, the blinding key R is fed to the first exponent input of the MMEC, public RSA-exponent E is fed to the second exponent input of the MMEC, and the RSA-module N is fed to the module input of the MMEC. At the output of the MMEC a data S are obtained, which is the digital RSA-signature on the initial data M.

To confirm the signature property of the digital RSA-signature on the initial data M the supplier feeds the data S obtained at the output of the unblinding converter, onto the base input of the modular exponentiator, the public RSA-exponent E onto the exponent input of the modular exponentiator, and the RSA-module N onto the module input of the modular exponentiator. The output data of the modular exponentiator are fed to an input of the comparator onto another input of which the initial data M are fed. If one obtains the Boolean value "TRUE" at the output of the comparator, then the data S obtained at the output of the unblinding converter, are taken for a digital RSA-signature on the initial data M. In the best embodiment of the method for making a blind digital RSA-signature by the second variant, the signer takes several odd pairwise coprime integers $E_1, \ldots, E_k$ which number depends on the problem to be solved as basic public RSA-exponents, and two prime numbers P and Q of suitable size such that each of the two integers P–1 and Q–1 is coprime to each of the chosen basic public RSA-exponents, as the secret factors. The choice of such prime numbers can be performed, for example, by testing the trial prime numbers, which are obtained in one of the known ways with the help of the random-number generators. The RSA-module N is obtained by multiplying the chosen secret factors. The basic admissible exponents chosen are made public. The limiting multiplicities $L_1, \ldots, L_k$ of the basic public RSA-exponents $E_1, \ldots, E_k$, respectively, are chosen by the supplier in accordance with the problem to be solved. The supplier chooses the randomized blinding key R with the help of the cryptographic random-number generator with a uniform distribution.

The following example clarifies the possibility of realization of the above-described best embodiment of the method for making a blind digital RSA-signature by the second variant.

EXAMPLE 2

The signer chooses integers $E_1=3, E_2=5, E_3=7$ as the basic public RSA-exponents. The signer takes two prime numbers P and Q having size of 512 bits and the RSA-module N=P·Q, which is obtained from P and Q with the help of a multiplier, as the secret factors. Furthermore, the secret factors are chosen to be such that each of the integers P–1, Q–1, and N–1 is coprime to each basic public RSA-exponent. Such secret factors are chosen by testing the mentioned properties of trial secret factors, which are prime numbers having size of 512 bits and obtained with the help of the cryptographic random-number generator. The choice of such prime numbers and their testing are performed in one of the known ways (A. J. Menezes, P. C. Van Oorshot, S. A. Vanstone, Handbook of Applied Cryptography, CRC Press, 1997, p. 145). The chosen RSA-module N and the chosen basic admissible exponents are made public.

As the initial data M, the supplier takes an arbitrary integer representing the data to be signed. As the limiting multiplicities $L_1, L_2, L_3$ of the basic public RSA-exponents $E_1, E_2, E_3$, respectively, the supplier chooses arbitrary nonnegative integers depending on the problem to be solved; in this example, we have $L_1=100, L_2=50, L_3=10$. As the randomized blinding key R, the supplier takes an integer having size of 1024 bits and appearing at the output of the cryptographic random-number generator with a uniform distribution.

The supplier obtains from the blinding key R a chain of data $F_0, F_1, \ldots, F_L$, where $L=L_1+L_2+L_3$. Here, the blinding key R is taken as the data F0, and the next data Fj is obtained at the output of the modular exponentiator to which module input the RSA-module N is fed, to which base input the preceding element of the chain is fed, and to which exponent input the RSA-exponent $E_{1\ is\ fed\ L1}$ times, the RSA-exponent $E_2$ is fed $L_2$ times, and the RSA-exponent $E_3$ is fed $L_3$ times. The obtained data $F_L$ is fed to the argument input of the modular multiplier, onto which another input the initial data M are fed, and onto which module input the RSA-module N is fed. At the output of the modular multiplier the blinded data M' are obtained, which are delivered to the signer via telecommunication nets, together with the information on the chosen limiting multiplicities $L_1, L_1, L_3$.

The signer takes the employed multiplicities $K_1, K_2, K_3$ of the basic public RSA-exponents $E_1, E_2, E_3$, respectively. Here, the used multiplicities $K_1, K_2, K_3$ are chosen in the limits of the chosen limiting multiplicities $L_1, L_2, L_3$, respectively. In this example, one takes $K_1=90, K_2=40, K_3=1$. The secret RSA-key and the digital RSA-signature S' on the blinded data M' are created in the same way as in the Example 1.

The supplier obtains from the blinding key R a chain of data $T_0, T_1, \ldots, T_I$, where $I=L_1-K_1+L_2-K_2+L_3-K_3$. Here, the blinding key R is taken as the data $T_0$, and the next data $T_j$ is obtained at the output of the modular exponentiator to which module input the RSA-module N is fed, to which base input the preceding element of the chain is fed, and to which exponent input one feeds the RSA-exponent $E_1$ is fed $(L_1-K_1)$ times, the RSA-exponent $E_2$ is fed $(L_2-K_2)$ times, and the RSA-exponent $E_3$ is fed $(L_3-K_3)$ times. The obtained data $T_1$ are taken as the unblinding key T. A modular divider is used as the unblinding converter. When unblinding, the digital RSA-signature S' on blinded data, the unblinding key T, and the RSA-module N are fed to the dividend input, the divisor input, and the module input of the modular divider, respectively. At the output of the unblinding converter, a digital RSA-signature on the initial data M is obtained.

In the best embodiment of the apparatus for making a blind digital RSA-signature, a cryptographic random-number generator with a uniform distribution is used as the random-number generator. The possibility of implementing the apparatus for making a blind digital RSA-signature is clarified by the following concrete example, which is illustrated by FIG. 1 described in the description of the claimed apparatus.

EXAMPLE 3

Though in real digital RSA-signature systems the secret factors are used consisting of many dozens of digits, for the sake of simplicity in this example the secret factors consist of a small number of digits. Suppose that the signer has chosen the secret factors P=419 and Q=863, the RSA-module N=361597, and the public RSA-exponent E=3, and after that the signer has communicated N and E to all interested parties. Suppose that the supplier wishes to obtain a blind digital RSA-signature of the initial data M=123456. For this purpose, the supplier feeds the initial data M to the initial data input 10, and the RSA-module N to the module input 11 of the blinding unit 2. In addition, the supplier feeds the public RSA-exponent E to the first limiting input 7 of the arithmetic controller 6, and the RSA-module N decremented by 1, i.e., the integer 123455, to the second limiting input 8 of the arithmetic controller 6. Suppose that the integer R=901 appears at the output of the blinding key choice unit 1. The integer R is fed to the blinding key input 12 of the blinding unit 2 at whose output the data M'=237367 appears. The signer feeds the secret key (N, D) corresponding to the public RSA-exponent, i.e., D=240211, onto the secret key input 13 of the signature unit 3. The integer M' is fed onto the signing data input 14 of the signature unit 3, and the integer T'=88275 appears at the output of the signature unit 3 and is fed to the unblinding data input 15 of the unblinding unit 4. Furthermore, the supplier feeds the RSA-module N, the initial data M, and the public RSA-exponent E, respectively, onto the module input 16, the initial data input 19, and the exponent input 17 of the unblinding unit 4. In addition, the integer R is fed to the blinding key input 18 of the unblinding unit 4. At the output of the unblinding unit the data T=150340 are obtained, which is a digital RSA-signature on the initial data M.

Figure 2:
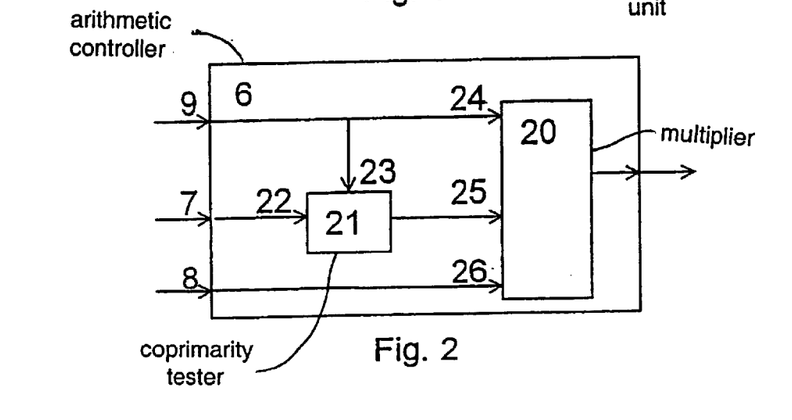
FIG. 2 shows an arithmetic controller.

The possibility of implementing the blinding key choice unit of the apparatus for making a blind digital RSA-signature and the arithmetic controller related to it is clarified by the following example.

EXAMPLE 4

The example is illustrated by FIG. 1 and FIG. 2. FIG. 2 shows arithmetic controller 6, which has an inadmissible divisor input 7, an obligatory divisor input 8, a trial data input 9, comprises a multiplier 20 and a coprimality tester 21. Here, the inadmissible divisor input 7 is connected to an input 22 of the coprimality tester, the trial data input 9 is connected to an input 23 of the coprimality tester and to an argument input 24 of the multiplier 20, an output of the coprimality tester 21 is connected to a load input 25 of the multiplier 20, the obligatory divisor input 8 of the arithmetic controller 6 is connected to an argument input 26 of the multiplier 20 which output is connected to the output of the arithmetic controller 6.

A specific example of functioning of the blinding key choice unit 1 of the above-described apparatus for making a blind digital RSA-signature is as follows. Suppose that the integer 1234 appears at the output of the random-number generator 5 and is fed to the trial data input 9 of the arithmetic controller 6. Suppose that the integer 7 is fed to the first limiting input 7 and the integer 5 is fed to the second limiting input 8. Integers 1234 and 7 are fed, respectively, onto inputs 23 and 22 of the coprimality tester 21 at which output the Boolean value 1 ("TRUE") appears. This value is fed to the load input 25 of the multiplier 20, and after that the multiplier 20 takes the data 1234 and 5, given to its argument inputs 24 and 26, respectively. The integer 1234·5=6170 appears at the output of the multiplier 20 and also appears at the output of the arithmetic controller 6 and at the output of the blinding key choice unit 1.

To confirm the realizability, the applicant gives an example of a concrete realization of a MMEC and of its functioning in the example given below.

EXAMPLE 5

Figure 3:
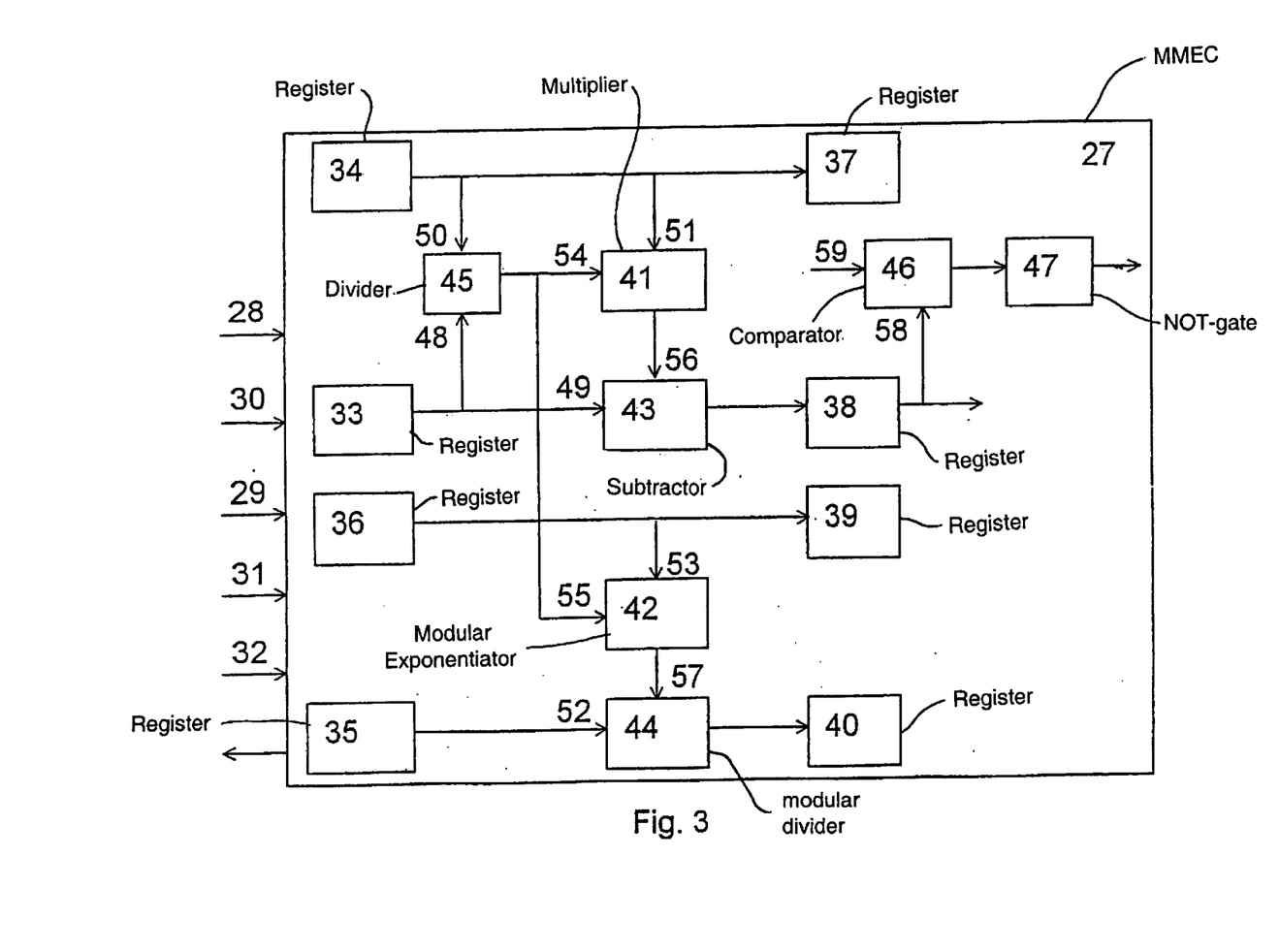
FIG. 3 shows a modular multiplicative Euclidean converter (MMEC).

The example is illustrated by FIG. 3. FIG. 3 shows the MMEC 27, which has a base input 28 and the corresponding exponent input 29, a base input 30 and the corresponding exponent input 31, a module input 32, and an output. The MMEC comprises registers 33–40, a multiplier 41, a modular exponentiator 42, a subtractor 43, a modular divider 44, a divider 45, a comparator 46, and a NOT-gate 47. Here, the base input 28 is connected to the data input of the register 35, the second base input 30 is connected to the data input of the register 36, the exponent input 29 is connected to the data input of the register 33, the exponent input 31 is connected to the data input of the register 34, and the module input 32 is connected to the module inputs of the modular divider 44 and the modular exponentiator 42. In addition, the MMEC 27 comprises an output register, which is not shown in FIG. 3 and which output is connected to the output of the MMEC 27, and which data input is connected to the output of the register 39. The output of the register 33 is connected to the dividend input 48 of the divider 45 and with the minuend input 49 of the subtractor 43. The output of the register 34 is connected to the divisor input 50 of the divider 45, with an input 51 of the multiplier 41, and with the data input of the register 37. The output of the register 35 is connected to the dividend input 52 of the modular divider 44. The output of the register 36 is connected to the input 53 of the modular exponentiator 42 and to the data input of the register 39. The output of the divider 45 is connected to the input 54 of the multiplier 41 and to the exponent input 55 of the modular exponentiator 42. The input of the multiplier 41 is connected to the subtrahend input 56 of the subtractor 43, and the output of modular the exponentiator 42 is connected to a divisor input 57 of the modular divider 44. The output of the subtractor 43 is connected to the data input of the register 38, and the output of the modular divider 44 is connected to the data input of the register 40. The output of the register 37 is connected to the data input of the register 33, the output of the register 38 is connected to the data input of the register 34, the output of the register 39 is connected to the data input of the register 35, but these connections are not shown. The output of the register 38 is connected to an input 58 of the comparator 46, and the output of the comparator 46 is connected to the load input of the output register and with the input of NOT-gate 47 which output is connected to the load inputs of registers 33–36, but these connections are not shown. Furthermore, the MMEC 27 comprises the circuit for initial loading the registers 33–36, the circuit for feeding zero to an input 59 of the comparator 46 and the synchronization circuit ensuring stepwise mode of operation of the MMEC, but these schemes are not shown in FIG. 3.

A specific example of functioning of the MMEC 27 is as follows. The data X=11 is fed to the base input 28, the data Y=17 is fed to the base input 30, the data A=7 is fed to the exponent input 29, the data B=5 is fed to the exponent input 31, and N=37 is fed to the module input 32. After that, the initial loading circuit loads the values $R_1=A=7$ from the input 29, $R_2=B=5$ from input the 31, $U_1=X=11$, and $U_2=Y=17$ to registers 33–36, respectively. The functioning of the MMEC proceeds step-by-step, which is ensured by the synchronization circuit.

At the first step, the MMEC 27 operates as follows. The data $R_1=7$ from the register 33 and $R_2=5$ from the register 34 are fed to the dividend input 48 and divisor input 50 of the divider 45, respectively, and the incomplete quotient Q=1 of $R_1=7$ and $R_2=5$ appears at the output of the divider 45. The data Q=1 appears at the input 54 of the multiplier 41 and at the exponent input 55 of the modular exponentiator 42. The data $R_2=5$ is fed to the input 51 of the multiplier 41 from the register 34, and at the output of the multiplier 41 the data $Q \cdot R_2=5$ are obtained which are fed to the subtrahend input 56 of the subtractor 43. The data R32 7 are fed to the minuend input 49 of the subtractor 43 from the register 33, and at the output of the subtractor 43 the data $R_1-Q \cdot R_2=2$ are obtained which are fed to the register 38. The data $R_2=5$ are fed to the register 37 from the register 34. The data $U_2=17$ from the register 36 are fed to the base input 53 of the modular exponentiator 42, the data N=37 from the module input 32 is fed to the module input of the modular exponentiator 42, and at the output of the modular exponentiator 42 the data $S=U_2^Q \pmod{N}=17$ are obtained, that are fed to the divisor input 57 of the modular divider 44. The data $U_1=11$ from the register 35 is fed to the dividend input 52 of the modular divider 44, and at the output of the modular divider 44 the data $U1 \cdot S^{-1} \pmod{N}=5$ are obtained which are fed to the register 40. The register 36 feeds the data $U_2=17$ to the register 39. The register 38 feeds the data W=2 to the input 58 of the comparator 46, the zero feed circuit feeds zero to the input 59 of the comparator 46, and the Boolean value 0 ("FALSE") appears at the output of the comparator 46 and is fed to the load inputs of the registers of the first and second outputs (thus, no data are fed to the data inputs of the registers) and to the NOT-gate 47. The Boolean value 1 ("TRUE") appears at the output of the NOT-gate 47 and is fed to the load inputs of registers 33–36, after which these registers take the values $R_1=5$, $R_2=2$, $U_1=17$, $U_2=5$, respectively, form registers 35–38. This finishes the first step and initiates the second step.

After the second step, registers 33–36 contain the values $R_1=2$, $R_2=1$, $U_1=5$, $U_2=14$, after which the third step starts. In the course of the third step, registers 35–38 obtain the values 1, 0, 14, 17, respectively. After that, the Boolean value 1 ("TRUE") appears at the output of the comparator 46 and is fed to the load input of the output register, after which the register obtains the data Z=14 from the register 39, and this data appears at the output of the MMEC 27.

Variants of Implementing the Invention

The applicant points out the variant of the method for making a blind digital RSA-signature by the first variant, in which the integer 2 is taken as the masking factor G, which leads to an acceleration of blinding and unblinding. In this variant, the signer takes, as the secret factors, two prime numbers P and Q, such that each of the integers P−1 and Q−1 has no divisors greater than 2 and less than U, and is coprime to each of the basic public RSA-exponents, and, furthermore, the numbers P−1 and Q−1 have no common divisors greater than 2. The choice of such prime numbers can be performed by additionally checking for trial prime numbers, whether the greatest common divisor of the numbers P−1 and Q−1 is equal to 2. The randomized blinding key R is chosen by putting the unity to the lowest bit of an integer of a suitable size obtained at the output of the cryptographic random-number generator with a uniform distribution. In this case, to verify that the predetermined blinding level is ensured, the supplier can check with the help of the method "cut and choose" described in the description of the invention that none of the secret factors is congruent to the unity modulo the divisors greater than 2 and less than the published bound U, and that the secret factors decremented by 1 have no common divisors greater than 2.

As other particular cases of realization of the method for making a blind digital RSA-signature by the first variant, the applicant points out the possibility of choosing such secret factors and masking factor that the masking factor is not either a multiple of the greatest common divisor of the secret factors decremented by 1, or a multiple of all divisors of each of the secret factors decremented by 1 that are less than a predetermined bound. For example, the integer 1 can be taken as the masking factor. Though such a choice does not allow one to ensure an arbitrary proximity of the blinding level to the unity, nevertheless, in certain practical situations the untraceability achieved by such a choice, can be accepted as sufficient.

In a particular case of realization, the supplier can choose, as the initial data, the digital RSA-signature on some earlier initial data, which is already in hand, and thus obtain a digital RSA-signature on earlier initial data, which corresponds to the product of the public RSA-exponents.

In addition, after making a digital RSA-signature on the initial data, corresponding to the public RSA-exponent E, the supplier can make, without the signer help, a digital RSA-signature on the initial data corresponding to an arbitrary public RSA-exponent being the divisor E.

As particular cases of realization of the method for making a digital signature by each of the variants, the applicant points out the possibility of encryption, decryption, encoding, and decoding the data during their transmission from the supplier to the signer and back, which does not change the essence of the claimed invention. In particular, the kind of signature can depend on the time of making the signature on the blinded data by the signer, and may also reflect the degree of the confidence of the signer in the supplier. Furthermore, during the transmission from the supplier to the signer, the blinded data may be subjected to an additional blinding transformation, and during the transmission from the signer to the supplier the digital RSA-signature on the blinded data can be subjected to the corresponding unblinding transformation.

In the realization of the method for making a digital signature by any of the variants, the digital RSA-signature property of the made digital RSA-signature on the initial data can be verified either after unblinding the digital RSA-signature on the blinded data by a direct verification, or before unblinding by verifying the fact that the obtained digital RSA-signature on the blinded data meets a digital RSA-signature property related to the blinded data.

The applicant points out that in particular cases of realization of the apparatus for making a blind digital RSA-signature, connections between different units can be implemented via telecommunication nets, and the units themselves may be distant from each other. As other particular cases of the apparatus, the applicant points out the possibility of its realization in the form of various other subdivisions of auxiliary devices contained in it into blocks which do not change the essence of the claimed invention. The connection between the blocks can also be implemented by way of passing these connections through additional devices. Among such additional devices, there may be, in particular, encryption and decryption devices, as well as encoding and decoding devices. Furthermore, the claimed apparatus can be complemented by other known apparatuses, in particular, by apparatuses for verification of the RSA-signature.

Industrial applicability

The invention can be used in electronic queuing systems, including digital signature, especially those where the protection of the users' privacy is wished under the high diversity of kinds of the signature. In particular, the invention can be used in telecommunication systems, cryptographic systems, payment systems, in bank operations, in timestamping systems, in lotteries, in net computer games, in systems of value cards and valuable documents, and in many other areas.

What is claimed is:

1. A method for making a blind digital RSA-signature, comprising steps of choosing secret factors and an RSA-module corresponding to them, choosing at least one admissible public RSA-exponent, choosing initial data, choosing a randomized blinding key, choosing an encryption RSA-key whose module corresponds to the chosen RSA-module and whose exponent corresponds to the chosen blinding key with which key an RSA-encryption is performed while creating blinded data, arbitrarily choosing a secret RSA-key corresponding to the chosen secret factors and an arbitrary admissible public RSA-exponent, and creating a digital RSA-signature on the blinded data corresponding to said secret RSA-key, unblinding the created digital RSA-signature on the blinded data by inputting the digital RSA-signature on the blinded data, the blinding key, the RSA module, and the public RSA-exponent corresponding to the secret RSA-key used in creating the digital RSA-signature on the blinded data, into an unblinding converter whose output data are obtained as the digital RSA-signature on the chosen initial data, characterized in that during the step of creating the blinded data an RSA-encryption of the chosen initial data is performed, during the step of unblinding the created digital RSA-signature on the blinded data the chosen initial data are input additionally into the unblinding converter, a masking factor coprime to each admissible public RSA-exponent is additionally chosen, and the blinding key is chosen coprime to each admissible public RSA-exponent and as a multiple to the chosen masking factor.

2. The method for making a blind digital RSA-signature according to claim 1, characterized in that during the step of unblinding the created digital RSA-signature on the blinded data the chosen initial data preliminarily input into the unblinding converter are fed to one of base inputs of a modular multiplicative Euclidean converter (MMEC) contained in said unblinding converter, the created digital RSA-signature on the blinded data preliminarily input into the unblinding converter is fed to another base input of said unblinding converter, the chosen blinding key is fed to an exponent input of the MMEC corresponding to that base input on which said chosen initial data are fed, and the public RSA-exponent, which is preliminarily input into said unblinding converter and corresponds to the secret key utilized during creating the digital RSA-signature on the blinded data, is fed to an exponent input of the MMEC corresponding to that base input on which the created digital RSA-signature on the blinded data is fed.

3. The method for making a blind digital RSA-signature according to claim 1, characterized in that the randomized blinding key is chosen by a random-number generator.

4. The method for making a blind digital RSA-signature according to claim 3, characterized in that the step of choosing the randomized blinding key coprime to the chosen admissible public RSA-exponents is performed by correcting output data of the random-number generator with the chosen admissible public RSA-exponents.

5. The method for making a blind digital RSA-signature according to claim 3, characterized in that the step of choosing the randomized blinding key is performed by testing whether the output data of the random-number generator are coprime to the chosen admissible public RSA-exponents.

6. The method for making a blind digital RSA-signature according to claim 1, characterized in that the masking factor is chosen multiple to the greatest common divisor of the secret factors decremented by 1, and also to each divisor which is less than the predetermined bound and modulo which at least one of the secret factors is congruent to 1.

7. The method for making a blind digital RSA-signature according to claim 6, characterized in that the step of choosing the masking factor multiple to the greatest common divisor of the secret factors decremented by 1 is performed by choosing an RSA-module corresponding to two secret factors, and by choosing the masking factor multiple to the greatest one of those divisors of the RSA-module decremented by 1 that are coprime to the chosen admissible public RSA-exponents.

8. The method for making a blind digital RSA-signature according to claim 7, characterized in that the step of choosing the masking factor multiple to the greatest one of those divisors of the RSA-module decremented by 1 that are coprime to the chosen admissible public RSA-exponents, is performed by choosing admissible public RSA-exponents coprime to said RSA-module decremented by 1, and by choosing said RSA-module decremented by 1 as the masking factor.

9. The method for making a blind digital RSA-signature according to claim 6, characterized in that the step of choosing the masking factor multiple to each divisor which is less than the predetermined bound and modulo which at least one of the secret factors is congruent to 1, is performed by additionally testing the secret factors to be congruent to 1 modulo all those divisors which are greater than two and less than the predetermined bound.

10. The method for making a blind digital RSA-signature according to claim 6, characterized in that the step of choosing the masking factor multiple to the greatest common divisor of the secret factors decremented by 1 is performed by additionally pairwise testing the secret factors, during the step of choosing them, for a simultaneous congruence to 1 modulo all those divisors that are greater than two, and by choosing the masking factor even, wherein in the step of choosing the secret factors a simultaneous pairwise non-congruence to 1 modulo all those divisors greater than two is accepted as a criterion of the step of choosing the secret factors.

11. The method for making a blind digital RSA-signature according to claim 10, characterized in that the step of additionally pairwise testing the secret factors for a simultaneous congruence to 1 modulo all those divisors greater than two, is performed by comparing the value of the greatest common divisor of the secret factors decremented by 1 with an integer equal to two.

12. The method for making a blind digital RSA-signature according to claim 1, characterized in that in the step of creating the blinded data the RSA-encryption of the chosen initial data is performed by means of a modular exponentiator.

13. The method for making a blind digital RSA-signature according to claim 1, characterized in that an integer equal to two is chosen as the masking factor, during the step of choosing the secret factors they are additionally tested for a congruence to 1 modulo all those divisors greater than two and less than the predetermined bound and, pairwise, for a simultaneous congruence to 1 modulo all those divisors greater than two, wherein a non-congruence to 1 modulo all those divisors greater than two and less than the predetermined bound and a simultaneous pairwise non-congruence to 1 modulo all those divisors greater than two is accepted as a criterion of the step of choosing the secret factors.

14. The method for making a blind digital RSA-signature according to claim 13, characterized in that in the step of choosing the secret factors, the step of additionally pairwise testing the secret factors for the simultaneous congruence to 1 modulo all those divisors greater than two is performed by comparing the value of the greatest common divisor of the secret factors decremented by 1 with an integer equal to two.

15. The method for making a blind digital RSA-signature according to claim 1, characterized in that the RSA-signature on the blinded data is created by means of a modular exponentiator.

16. The method for making a blind digital RSA-signature according to claim 1, characterized in that the RSA-module is chosen corresponding to two secret factors, the admissible public RSA-exponents are chosen coprime to the RSA-module decremented by 1, in the step of choosing the secret factors said secret factors are testing for a congruence to 1 modulo all those divisors greater than two and less than the predetermined bound, wherein a non-congruence to 1 modulo all those divisors greater than two and less than the predetermined bound is accepted as a criterion of the step of choosing the secret factors, and the masking factor is chosen multiple to the RSA-module decremented by 1.

17. The method for making a blind digital RSA-signature according to claim 16, characterized in that the RSA-module decremented by 1 is chosen as the masking factor.

18. The method for making a blind digital RSA-signature according to claim 6, or the claim 13, or the claim 16, characterized in that the predetermined bound is chosen according to the predetermined blinding level.

19. The method for making a blind digital RSA-signature according to claim 1, characterized in that in the step of choosing the admissible public RSA-exponents an arbitrary public RSA-exponent whose only divisors are divisors of arbitrarily chosen basic public RSA-exponents is accepted as the admissible public RSA-exponent.

20. The method for making a blind digital RSA-signature according to claim 19, characterized in that the step of choosing the blinding key coprime to each admissible public RSA-exponent is performed by testing whether said blinding key is coprime to each basic public RSA-exponent.

21. The method for making a blind digital RSA-signature according to claim 19, characterized in that the step of choosing the blinding key coprime to each admissible public RSA-exponent is performed by correcting the output data of the random-number generator by the chosen basic public RSA-exponents.

22. A method for making a blind digital RSA-signature, comprising steps of choosing secret factors and an RSA-module corresponding to them, choosing at least one admissible public RSA-exponent, choosing initial data, choosing a randomized blinding key, choosing an encryption RSA-key whose module corresponds to the chosen RSA-module and with which the RSA-encryption is performed while creating the blinded data, the chosen initial data being processed with a result of the RSA-encryption while creating the blinded data, arbitrarily choosing a secret RSA-key corresponding to the chosen secret factors and an arbitrary admissible public RSA-exponent, and creating a digital RSA-signature on the blinded data, corresponding to said secret RSA-key, creating an unblinding key corresponding to the blinding key and the secret RSA-key utilized while creating the digital RSA-signature on the blinded data, unblinding the created digital RSA-signature on the blinded data by inputting the digital RSA-signature on the blinded data, which step of unblinding is performed by inputting said digital RSA-signature, the unblinding key and the RSA-module into an unblinding converter whose output data are received as the digital RSA-signature on the chosen initial data, characterized in that during the step of choosing at least one admissible public RSA-exponent a step of additionally choosing at least one basic public RSA-exponent is performed, for each of which basic public RSA-exponents an arbitrary limiting multiplicity is chosen, and an arbitrary public RSA-exponent constituted from the chosen basic public RSA-exponents is accepted as the admissible public RSA-exponent, a multiplicity of each chosen basic public RSA-exponent being taken within a range of the chosen limiting multiplicity, during the step of creating the blinded data a step of RSA-encryption the chosen blinding key is performed, the encryption RSA-key by which the step of RSA-encryption being performed during the step of creating the blinded data is chosen corresponding to an RSA-exponent constituted from the chosen basic public RSA-exponents each of which being taken in the chosen limiting multiplicity, the step of arbitrarily choosing the secret RSA-key corresponding to the chosen secret factors and arbitrary admissible public RSA-exponent is performed by arbitrarily choosing utilized multiplicities of the basic public RSA-exponents within a range of the chosen limiting multiplicities of the basic public RSA-exponents, and the unblinding key is created by RSA-encryption of the blinding key with the encryption RSA-key as a module of which the RSA-module is taken, and whose RSA-exponent corresponds to the basic public RSA-exponents, each of said basic public RSA-exponents being taken in a multiplicity equal to the difference between the limiting multiplicity corresponding to said basic public RSA-exponent and the utilized multiplicity chosen in the step of arbitrarily choosing the secret key and corresponding to said limiting multiplicity.

23. The method for making a blind digital RSA-signature according to claim 22, characterized in that the step of choosing the randomized blinding key is performed by means of a random-number generator.

24. The method for making a blind digital RSA-signature according to claim 22, characterized in that in the step of creating the blinded data the step of RSA-encryption of the chosen blinding key is performed by consecutive RSA-encryptions with the encryption RSA-keys, the RSA-module being taken as a module of each of said RSA-keys, and the basic public RSA-exponents being taken as the RSA-exponents, each of said basic public RSA-exponents being taken in the chosen limiting multiplicity.

25. The method for making a blind digital RSA-signature according to claim 22, characterized in that the step of creating the unblinding key by RSA-encryption of the blinding key with the encryption RSA-key is performed by consecutive RSA-encryptions with the encryption RSA-keys, the RSA-module being taken as a module of each of said RSA-keys, and the basic public RSA-exponents being taken as the RSA-exponents, each of said basic public RSA-exponents being taken in the multiplicity equal to the difference between the limiting multiplicity corresponding to said basic public RSA-exponent, and a utilized multiplicity chosen in the step of arbitrarily choosing the secret key and corresponding to said limiting multiplicity.

26. The method for making a blind digital RSA-signature according to claim 22, characterized in that the step of RSA-encryption during steps of creating the blinded data and creating the unblinding key is performed by means of a modular exponentiator.

27. The method for making a blind digital RSA-signature according to claim 22, characterized in that the digital RSA-signature on the blinded data is created by means of a modular exponentiator.

28. An apparatus for making a blind digital RSA-signature, comprising a blinding key choice unit having a random-number generator and a blinding unit having a modular exponentiator whose module input being connected to a module input of the blinding unit and whose exponent input being connected to a blinding key input of the blinding unit, said blinding unit has an initial data input and one output being connected to a signature data input of a signature unit which has a secret key input and one output being connected to an unblinding data input of an unblinding unit which has a signature output, a module input, an exponent input and a blinding key input, characterized in that a base input of the modular exponentiator of the blinding unit is connected to the initial data input of the blinding unit, and the output of the modular exponentiator is connected to the output of the blinding unit, the unblinding unit has additionally an initial data input and comprises a modular multiplicative Euclidean converter (MMEC) having a module input, base inputs and exponent inputs corresponding to each of said base inputs, the module input of the unblinding unit being connected to the module input of the MMEC, the initial data input of the unblinding unit being connected to one of the base inputs of the MMEC, and an unblinding data input of the unblinding unit being connected to another base input of the MMEC, the blinding key input of the unblinding unit is connected to the exponent input of the MMEC which corresponds to the base input of the MMEC connected to the unblinding data input of the unblinding unit, and the exponent input of the unblinding unit is connected to the exponent input of the MMEC which corresponds to the base input of the MMEC connected to the initial data input of the unblinding unit, and the output of the unblinding unit is connected to the output of the MMEC, the blinding key choice unit comprises additionally an arithmetic controller with two limiting inputs which are accepted conditionally as first and second limiting inputs, the arithmetic controller being connected to the random-number generator, an output of the arithmetic controller is connected to the output of the blinding key choice unit, and the arithmetic controller is made so as to provide output data of the blinding key choice unit coprime to integers fed onto the first limiting input of the arithmetic controller, and to provide the divisibility of the output data of the blinding key choice unit with an integer fed onto the second limiting input of the arithmetic controller.

29. The apparatus for making a blind digital RSA-signature according to claim 28, characterized in that the connection of the arithmetic controller to the random-number generator is performed by means of connecting the output of the random-number generator to the input accepted conditionally as test data input of the arithmetic controller, and coprimality of the output data of the blinding key choice unit to integers fed onto the first limiting input of the arithmetic controller and the divisibility of the output data of the blinding key choice unit with an integer fed onto the second limiting input of the arithmetic controller are provided by means of that the arithmetic controller comprises a multiplier and a coprimality tester, the first limiting input of the arithmetic controller being connected to an input of the coprimality tester, the test data input being connected to another input of the coprimality tester and to an argument input of the multiplier, an output of the coprimality tester being connected to a loading input of the multiplier, and the second limiting input of the arithmetic controller being connected to the argument input of the multiplier, whose output is connected to the output of the arithmetic controller.

* * * * *